United States Patent
Schwärzler

Patent Number: 5,217,410
Date of Patent: Jun. 8, 1993

[54] ROTARY BALL JOINT HAVING A PLURALITY OF FORCE TRANSMITTING BALLS PROVIDING CONNECTION BETWEEN THE INNER AND OUTER MEMBERS

[75] Inventor: Peter Schwärzler, Glattbach, Fed. Rep. of Germany

[73] Assignee: Lohr & Bromkamp GmbH, Offenbach, Fed. Rep. of Germany

[21] Appl. No.: 738,797

[22] Filed: Jul. 31, 1991

[30] Foreign Application Priority Data

Aug. 2, 1990 [DE] Fed. Rep. of Germany ....... 4024500

[51] Int. Cl.⁵ .................. F16D 3/221; F16D 3/227
[52] U.S. Cl. ................................. 464/141; 464/906
[58] Field of Search ................... 464/139, 141, 906

[56] References Cited

U.S. PATENT DOCUMENTS

| | | | |
|---|---|---|---|
| 2,322,570 | 6/1943 | Dodge | 464/906 X |
| 2,809,504 | 10/1957 | Erish | 464/141 |
| 3,106,077 | 10/1963 | Sharp | 464/906 X |
| 3,310,959 | 3/1967 | Sheppard | 464/139 |
| 4,078,400 | 3/1978 | Krude | 464/906 X |
| 4,425,101 | 1/1984 | Krude | 464/139 |

Primary Examiner—Daniel P. Stodola
Assistant Examiner—William G. Battista, Jr.
Attorney, Agent, or Firm—Harness, Dickey & Pierce

[57] ABSTRACT

A rotary ball joint, especially for angularly movable driveshafts for motor vehicles, has an outer joint member (11) with ball tracks (18) uniformly distributed on its inner circumference and an inner joint member (12) non-rotatingly connected to the outer joint member (11). The inner joint member (12) includes ball sockets (13) which correspond to the ball tracks of the outer joint members (11). The ball sockets comprise spherical inner faces and, via the balls (14) supported therein, establish a form-fitting connection between the inner joint member (12) and the outer joint member (11). A plurality of bearing balls (15) are positioned in the sockets to provide a bearing surface for the force-transmitting balls (14). In the inner joint member, the force-transmitting balls (14) are guided in the ball sockets (13) and in the outer joint member they are guided in the ball tracks (18).

10 Claims, 3 Drawing Sheets

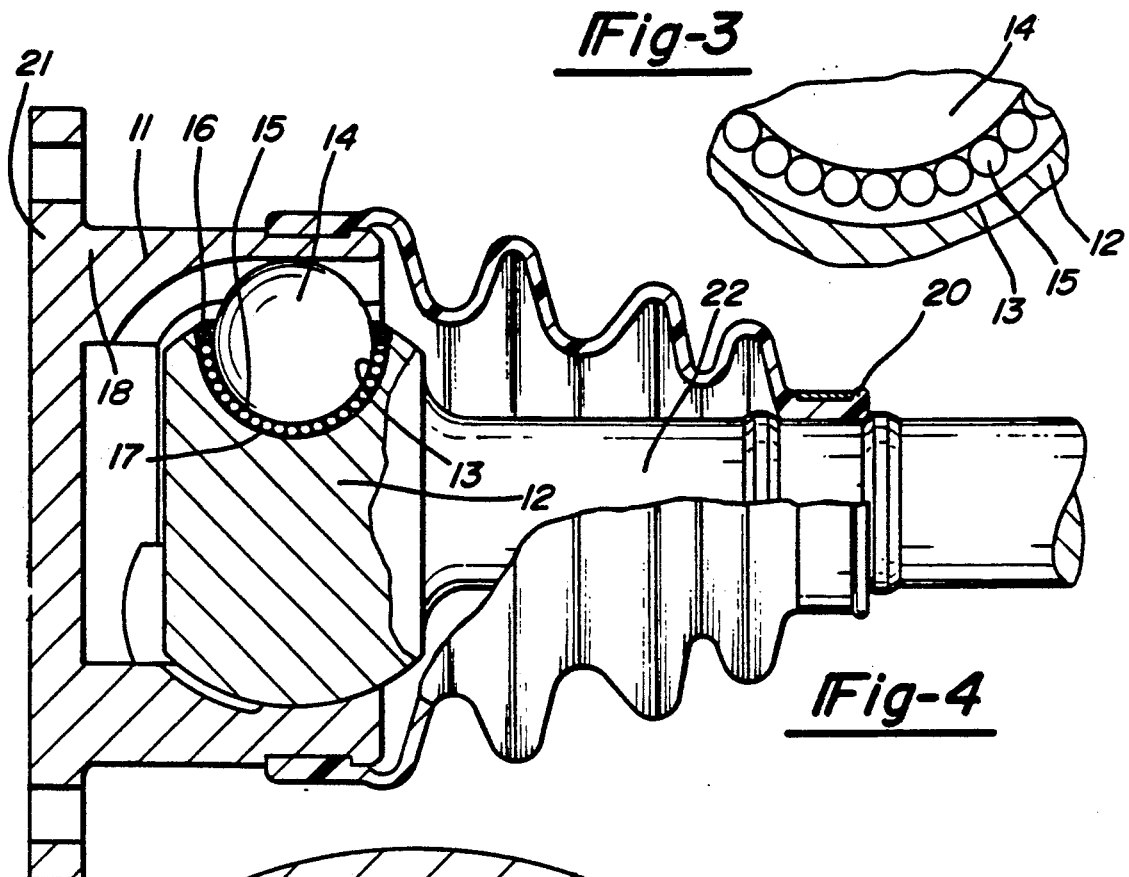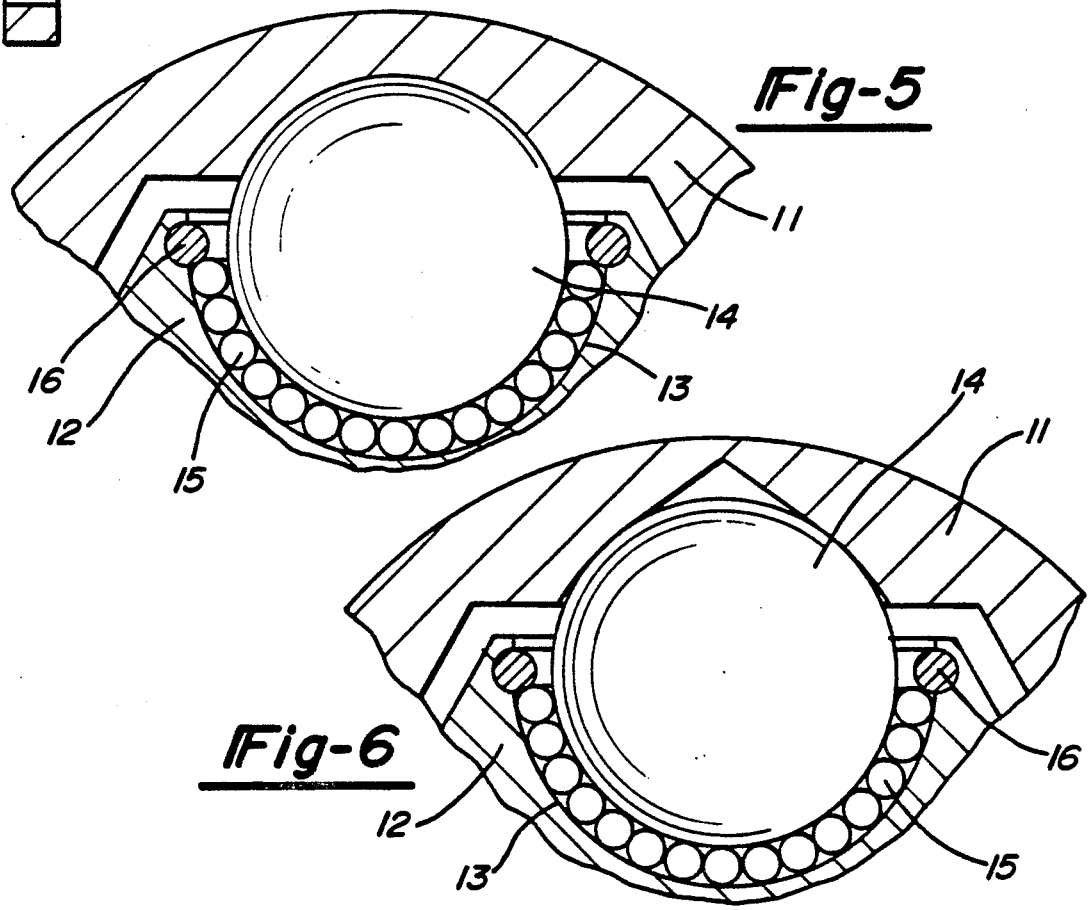

ROTARY BALL JOINT HAVING A PLURALITY OF FORCE TRANSMITTING BALLS PROVIDING CONNECTION BETWEEN THE INNER AND OUTER MEMBERS

BACKGROUND AND SUMMARY OF THE INVENTION

The present invention relates to a rotary ball joint and especially to rotary ball joints for angularly movable driveshafts for motor vehicles. The rotary joints include outer joint members with ball tracks uniformly distributed on their inner circumferences. Inner joint members with the circumferentially distributed recesses are non rotatably connected to the outer joint member. The recesses are associated with the ball tracks via, preferably, three force-transmitting balls which establish form-fitting connection between the inner joint members and the outer joint members. The balls are guided in the recesses and the ball tracks.

Relevant art joints illustrated in DE PS 32 06 435 or DE-AS 1 185 868 are designed as plunging joints or fixed joints used in propeller shafts of motor vehicle drives. The force-transmitting balls are supported on a central member, in the form of a cone or a ball, in the inner joint part. Depending on the articulation angle the force transmitting balls are subject to, a greater or lesser sliding friction will occur.

DE 28 04 778 C3 illustrates, for the purpose of reducing sliding friction, a telescopic driveshaft with force-transmitting balls received on guiding balls which ride in circular grooves in planes perpendicular to radial axes. The guiding balls rollingly rotate in only the direction of the circular grooves. Sliding friction occurs when the force-transmitting balls roll in the outer ball tracks.

GB-PS 1 266 501 illustrates support balls for ball rolling elements in a bearing bush guided by bearing balls. The bearing bushes are resiliently held, which means that the balls cannot transmit any transverse forces.

It is the object of the present invention to provide a rotary ball joint with force-transmitting balls, which, under joint articulation and axial vibrations, are able to rotate in their tracks in the outer member and in recesses in the inner member, while causing substantially no sliding friction.

The objective is achieved by supporting the force-transmitting balls in partially spherical sockets in the inner joint member by bearing balls. With the help of this measure it is possible to provide a rotary ball joint which is characterized by lower friction losses and ensures a reduction in axial excitation which provides easy plunging even under articulation angles. The bearing balls are free moving with respect to one another and held in the ball sockets by spring rings near the upper rim.

To avoid any mechanical forcing while ensuring the largest possible ball contact, at the base of the ball socket a clearance is present between the force-transmitting balls and bearing balls. Preferably, the ball sockets are produced in a non-chip-forming way, at least at said base of the ball sockets to reduce production costs. Several cross sectional shapes are proposed for the tracks in the outer joint member. In particular, the tracks in the outer joint member may include a base ball contacting region.

From the following detailed description taken in conjunction with the accompanying drawings and subjoined claims, other objects and advantages of the present invention will become apparent to those skilled in the art.

BRIEF DESCRIPTION OF THE DRAWINGS

FIG. 3 is a blown up exagerrated view of a portion of FIG. 2 illustrating the clearance between the force transmitting balls in the base region.

FIG. 4 is a view like that of FIG. 1 illustrating the tracks cured in the longitudinal direction.

FIG. 5 is a portion of a view like FIG. 2 illustrating another embodiment of the tracks.

FIG. 6 is a view like that of FIG. 2 showing an additional embodiment of the tracks.

DETAILED DESCRIPTION OF THE PREFERRED EMBODIMENT

Figure 1:
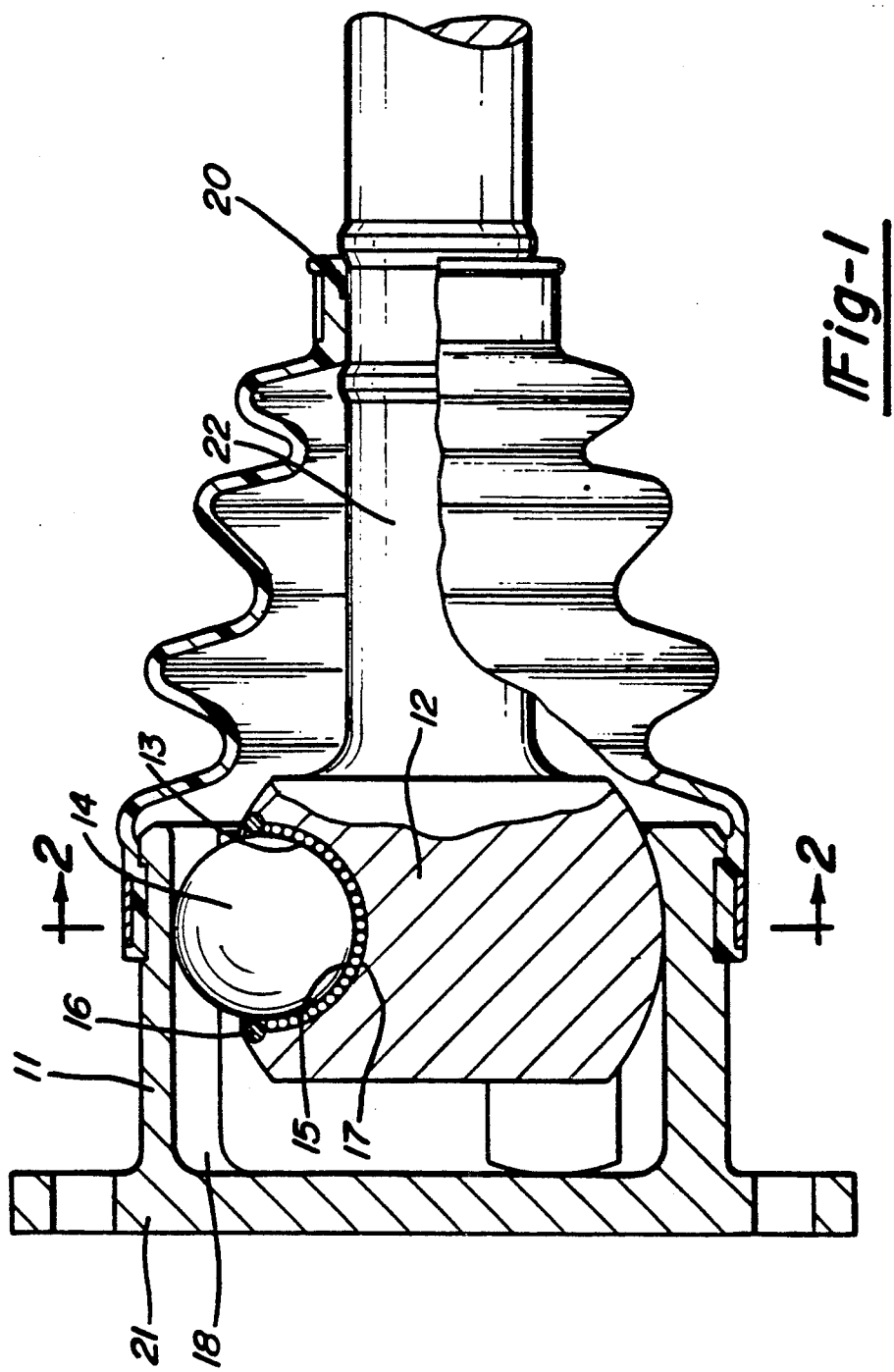
FIG. 1 is a longitudinal cross sectional view of a rotary joint in accordance with the present invention.
Figure 2:
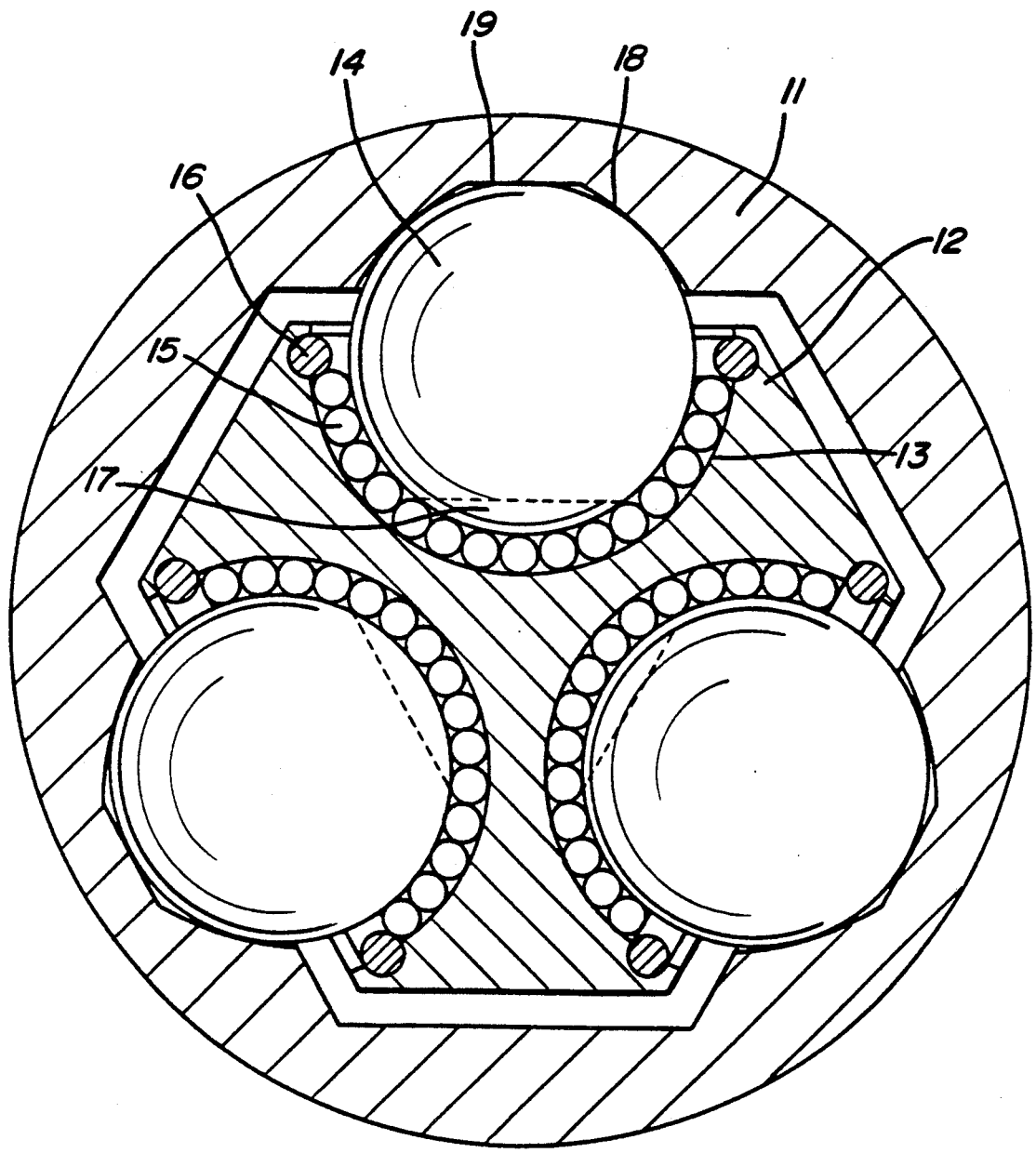
FIG. 2 is a sectional view of FIG. 1 through line 2—2 thereof.

A three-ball rotary joint is illustrated in FIGS. 1 and 2. The joint includes an outer joint member 11 integrally connected with a first shaft connection 21 and an inner joint member 12 integrally connected with a second shaft connection 22. The outer joint member includes ball tracks 18 uniformly distributed about the circumference of the outer joint inner surface. Preferably, the tracks 18 are offset relative to each other by 120°. The inner joint member 12 includes ball sockets or recesses 13 which are also uniformly distributed and offset relative to each other by 120°. The inner faces of the ball sockets 13 are spherical. The ball tracks 18 are longitudinally straight with a circular-arch-shaped or Gothic arch transverse cross section. The ball tracks 18 may also include a planar base 19 in transverse cross section as illustrated in FIG. 2. The tracks 18 extend parallel to the central joint axis.

For torque transmitting purposes, force-transmitting balls 14, rollingly movable in the ball tracks 18, are inserted into the ball sockets 13. Via the balls 14, the ball tracks 18 correspond with the ball sockets 13.

Small bearing balls 15 commonly held by spring rings 16 are inserted into the respective ball sockets 13. In the region of their socket base 17, the bearing balls 15 are provided with clearance so that this region does not have to be machined in a chip forming way.

In a torque free or resting condition, the force transmitting balls rest on their track bases 19. Through being supported on the bearing balls 15, the force-transmitting balls 14 are able to rotate freely around each axis. As a result, the friction losses between the inner joint member 12 and the outer joint member 11 are reduced to a minimum. The joint as a whole is sealed towards the outside by a convoluted boot 20.

While the above detailed description describes the preferred embodiment of the present invention, the invention is susceptible to modification, variation, and alteration without deviating from the scope and fair meaning of the subjoined claims.

I claim:

1. A rotary ball joint for angularly movable driveshafts comprising:
    an outer joint member having a plurality of tracks uniformly distributed on an inner circumferential surface;

an inner joint member non-rotatably connected to said outer joint member, said inner joint member having a plurality of recesses corresponding in number and circumferential position to the plurality of tracks;

a plurality of force-transmitting balls corresponding in number to said tracks and recesses and positioned in said corresponding tracks and recesses, said plurality of force-transmitting balls providing a connection between said outer and inner members, said plurality of force-transmitting balls being guided by said recesses and tracks; and bearing balls for providing reduced friction movement of said plurality of force-transmitting balls, said bearing balls positioned in said recesses underneath said balls in said inner joint member, said recesses being at least partially spherical.

2. The rotary ball joint according to claim 1 wherein said bearing balls are held in said recesses by a plurality of spring rings positioned adjacent said recesses.

3. The rotary ball joint according to claim 1 wherein in a torque free condition, a clearance is between said plurality of bearing balls and said plurality of force-transmitting balls at the base regions of said recesses respectively.

4. The rotary ball joint according to claim 1 wherein said recesses are formed in said inner joint member by a non-chip-forming method.

5. The rotary ball joint according to claim 1 wherein said ball tracks extend in the outer joint member so as to be parallel to a central longitudinal rotational axis of the joint.

6. The rotary ball joint according to claim 1 wherein said plurality of tracks extend so as to be curved in the longitudinal direction along a central longitudinal axis of the joint.

7. The rotary ball joint according to claim 1 wherein said plurality of tracks has a circular-arch shape in cross section.

8. The rotary ball joint according to claim 1 wherein said tracks have a Gothic arch shape in cross section.

9. The rotary ball joint according to claim 1 wherein said cross section of said plurality of tracks includes a flattened track base.

10. The rotary ball joint according to claim 9 wherein in a torque free condition, said plurality of force-transmitting balls in said tracks are in contact with said track base.

* * * * *